(12) United States Patent
Peinado et al.

(10) Patent No.: US 7,139,892 B2
(45) Date of Patent: Nov. 21, 2006

(54) IMPLEMENTATION OF MEMORY ACCESS CONTROL USING OPTIMIZATIONS

(75) Inventors: Marcus Peinado, Bellevue, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 10/610,666

(22) Filed: Jun. 30, 2003

(65) Prior Publication Data

US 2004/0221126 A1 Nov. 4, 2004

Related U.S. Application Data

(60) Provisional application No. 60/467,343, filed on May 2, 2003.

(51) Int. Cl.
*G06F 12/00* (2006.01)
(52) U.S. Cl. ................... 711/163; 711/203; 711/206
(58) Field of Classification Search ................ 711/163
See application file for complete search history.

(56) References Cited

U.S. PATENT DOCUMENTS

| | | | |
|---|---|---|---|
| 5,892,900 A | 4/1999 | Ginter et al. ............... 713/200 |
| 5,910,987 A | 6/1999 | Ginter et al. ............... 705/52 |
| 5,915,019 A | 6/1999 | Ginter et al. ............... 705/54 |
| 5,917,912 A | 6/1999 | Ginter et al. ............... 713/187 |
| 5,949,876 A | 9/1999 | Ginter et al. ............... 705/80 |
| 5,982,891 A | 11/1999 | Ginter et al. ............... 705/54 |
| 6,044,445 A * | 3/2000 | Tsuda et al. ................ 711/163 |
| 6,154,818 A * | 11/2000 | Christie ........................ 711/163 |
| 6,237,786 B1 | 5/2001 | Ginter et al. ............... 213/153 |
| 6,253,193 B1 | 6/2001 | Ginter et al. ............... 705/57 |
| 6,363,488 B1 | 3/2002 | Ginter et al. ............... 713/201 |
| 6,389,402 B1 | 5/2002 | Ginter et al. ............... 705/51 |
| 6,427,140 B1 | 7/2002 | Ginter et al. ............... 705/80 |
| 6,938,138 B1 * | 8/2005 | Beukema et al. ........... 711/163 |
| 2002/0116590 A1 * | 8/2002 | Franaszek et al. .......... 711/170 |
| 2003/0079103 A1 * | 4/2003 | Morrow ...................... 711/206 |
| 2003/0126398 A1 * | 7/2003 | Shinozaki .................... 711/206 |
| 2003/0200402 A1 * | 10/2003 | Willman et al. ............. 711/154 |
| 2003/0200405 A1 | 10/2003 | Willman et al. ............. 711/163 |
| 2003/0200412 A1 | 10/2003 | Peinado et al. ............. 711/202 |
| 2003/0204693 A1 * | 10/2003 | Moran et al. ................ 711/163 |
| 2004/0215907 A1 * | 10/2004 | Pizel et al. .................. 711/163 |
| 2004/0221125 A1 * | 11/2004 | Ananthanarayanan et al. ... 711/203 |

OTHER PUBLICATIONS

Bugnion, E. et al., "Disco: Running Commodity Operating Systems on Scalable Multiprocessors", *Proceedings of the 16th Symposium on Operating Systems Principles (SOSP)*, Oct. 1997, 1-14.
Coffing, C.L., "An x86 Protected Mode Virtual Machine Monitor for the MIT Exokernel", *Submitted to the Department of Electrical Engineering and Computer Science*, May 1999, 1-109.

(Continued)

*Primary Examiner*—Donald Sparks
*Assistant Examiner*—Matthew Bradley
(74) *Attorney, Agent, or Firm*—Woodcock Washburn LLP (57) ABSTRACT

Mechanisms are disclosed that may allow certain memory access control algorithms to be implemented efficiently. When memory access control is based on controlling changes to an address translation map (or set of maps), it may be necessary to determine whether a particular map change would allow memory to be accessed in an impermissible way. Certain data about the map may be cached in order to allow the determination to be made more efficiently than performing an evaluation of the entire map.

31 Claims, 6 Drawing Sheets

OTHER PUBLICATIONS

Goldberg, R.P., "Survey of Virtual Machine Research", *Computer*, 34-35.

Popek, G.J. et al., "Formal Requirements for Virtualizable Third Generation Architectures", *Communications of the ACM*, Jul. 1974, 17(7), 412-421.

Smith, J.E., "An Overview of Virtual Machine Architectures", Oct. 26, 2001, 1-20.

Waldspurger, C.A., "Memory Resource Management in VMware ESX Server", *Proceedings of the 5th Symposium on Operating Systems Design and Implementation*, Dec. 9-11, 2002, 1-15.

* cited by examiner

IMPLEMENTATION OF MEMORY ACCESS CONTROL USING OPTIMIZATIONS

CROSS-REFERENCE TO RELATED CASES

This application claims the benefit of U.S. Provisional Application No. 60/467,343, entitled "Techniques for Efficient Implementation of Memory Access Control," filed on May 2, 2003.

FIELD OF THE INVENTION

The present invention relates generally to the field of computer security. More particularly, the invention relates to efficient techniques for implementing an isolated or "curtained" memory using address translation control.

BACKGROUND OF THE INVENTION

In some circumstances, it is desirable to have an isolated or "curtained" portion of memory to which access is restricted. For example, a computer may run two operating systems which one operating system is secure and the other is not. In this case, it is desirable for the secure operating system to have a curtained memory in which it can store secret information that cannot be accessed by the non-secure operating system.

One way to implement curtained memory is through address translation control. Many modern computers use a virtual memory system, in which software running on the computer addresses the memory using virtual addresses, and a memory management unit uses a set of address translation maps to translate the virtual addresses into physical addresses. Typically, each process has its own address translation map, so that the mapping between virtual and physical addresses changes from process to process. It is possible to configure a given process's address translation map such that the process's map does not expose to the process any virtual address for a given block (e.g., page) of physical memory. Thus, by ensuring that only secure processes have virtual addresses for a given block of physical memory, it is possible to implement curtained memory by controlling the contents of the address translation maps.

One problem that arises when such a mechanism is used to implement curtained memory is that, since the address translation maps are stored in memory, every operation that writes the memory could potentially affect the maps, and thus might cause a virtual address for curtained memory to be exposed to a process that should not have access to curtained memory. One way to prevent such a virtual address from being exposed is to check every element of every map each time a write operation on the memory is performed in order to ensure that no page of curtained memory has a virtual address in the map of any process that should not have access to the curtained memory. However, given the frequency of write operations, this technique is inefficient.

In view of the foregoing, there is a need for a mechanism that overcomes the drawbacks of the prior art.

SUMMARY OF THE INVENTION

The present invention provides mechanisms for efficiently controlling changes to address translation maps. Curtained memory can be implemented by preventing address translation maps from entering a state in which a virtual address for a block of curtained memory would be exposed to a process (or other entity) that is not allowed to access the curtained memory. A "policy" defines what memory access operations are permitted, and a memory access control system can operate by prohibiting the address translation map from entering any state that violates the policy.

States in which such virtual addresses would be exposed can often be defined based on the intersection (or non-intersection) of two or more sets that satisfy a certain property, or the number of pages that satisfy a certain property. The identity of pages that are members of a defined set can be stored or cached, so that the membership of the set does not have to be computed each time a write operation is performed that could change the state of the address translation maps. The identity of pages in a set can be stored, for example, as a bit vector, and set operations such as union, intersection, etc. can be performed efficiently on such bit vectors. In some cases, the exact set that satisfies a particular property may be difficult to compute, but it may be mathematically provable that compliance with the policy can be assured by using some well-defined subset or superset as a proxy for the actual set. If the subset or superset is relatively easier to compute than the actual set, then the subset or superset may be used in place of the actual set.

Additionally, the permissibility of some write operations can be defined in terms of a count of some statistic—e.g., the number of pages that satisfy a certain property, the number of references to a given page, etc. Such a statistic can be effectively stored or cached as a reference counter, which can be updated through increment and decrement operations. The bit vectors or counters can be updated each time a map changes state, and then used efficiently to evaluate a memory access operation under the policy.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Exemplary Computing Arrangement

Figure 1:
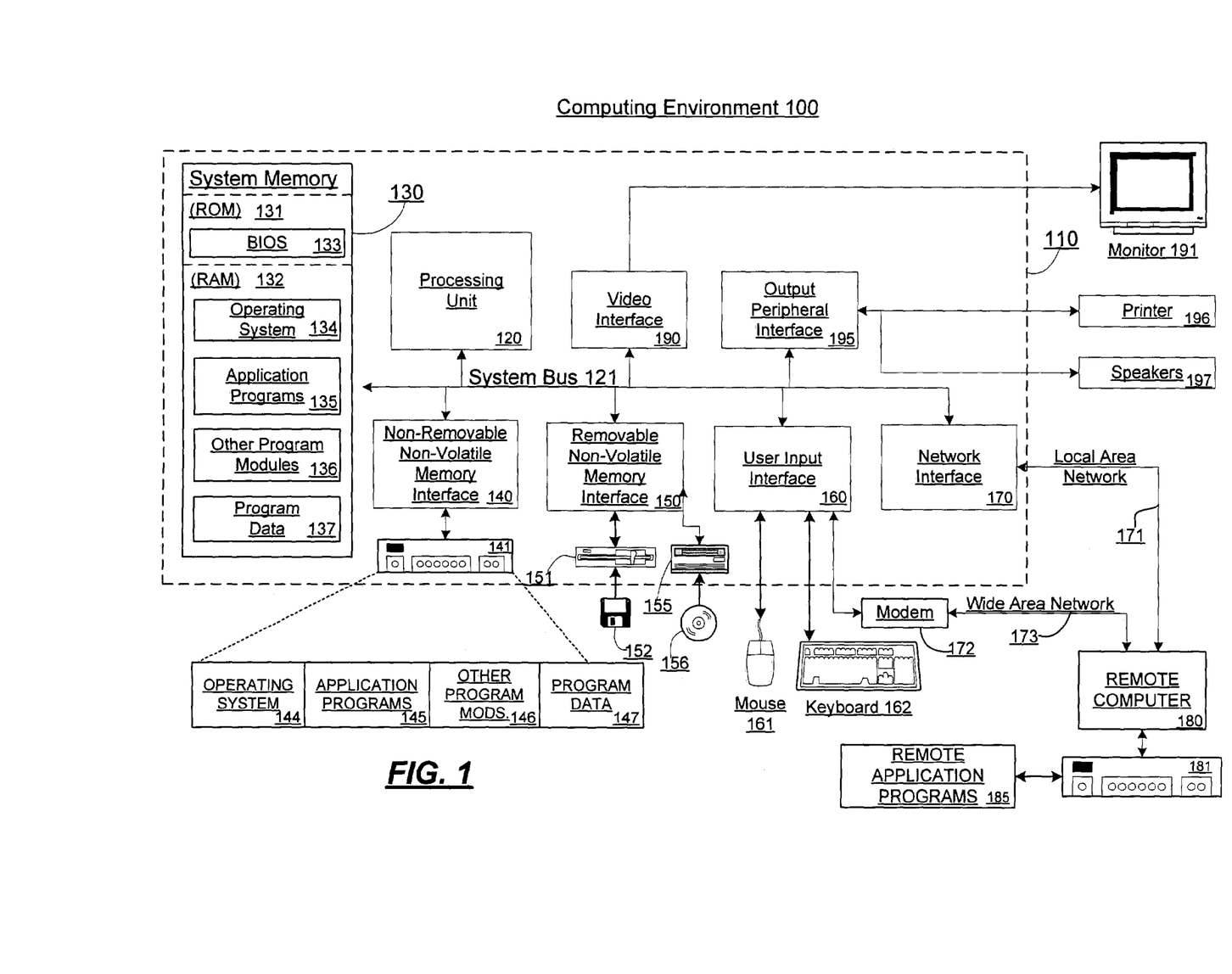
FIG. 1 is a block diagram of a computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes RAM, ROM, EEPROM, flash memory or other memory technology, CDROM, digital versatile disks (DVD) or other optical disk storage, magnetic cassettes, magnetic tape, magnetic disk storage or other magnetic storage devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Memory Access Using Address Translation

A memory in a computer system (e.g., RAM 132, shown in FIG. 1) has a physical address for each byte. Thus, the bytes that make up the memory can be viewed as being numbered, where each byte can be unambiguously identified by its number. In this case, the number constitutes a physical address. For example, in a 256-byte memory, the bytes may have physical addresses ranging from zero through $2^{28}-1$. However, in modern computer systems, memory is generally not accessed by its physical address, but rather by a virtual address. An address translation map is used to convert physical addresses to virtual addresses.

Figure 2:
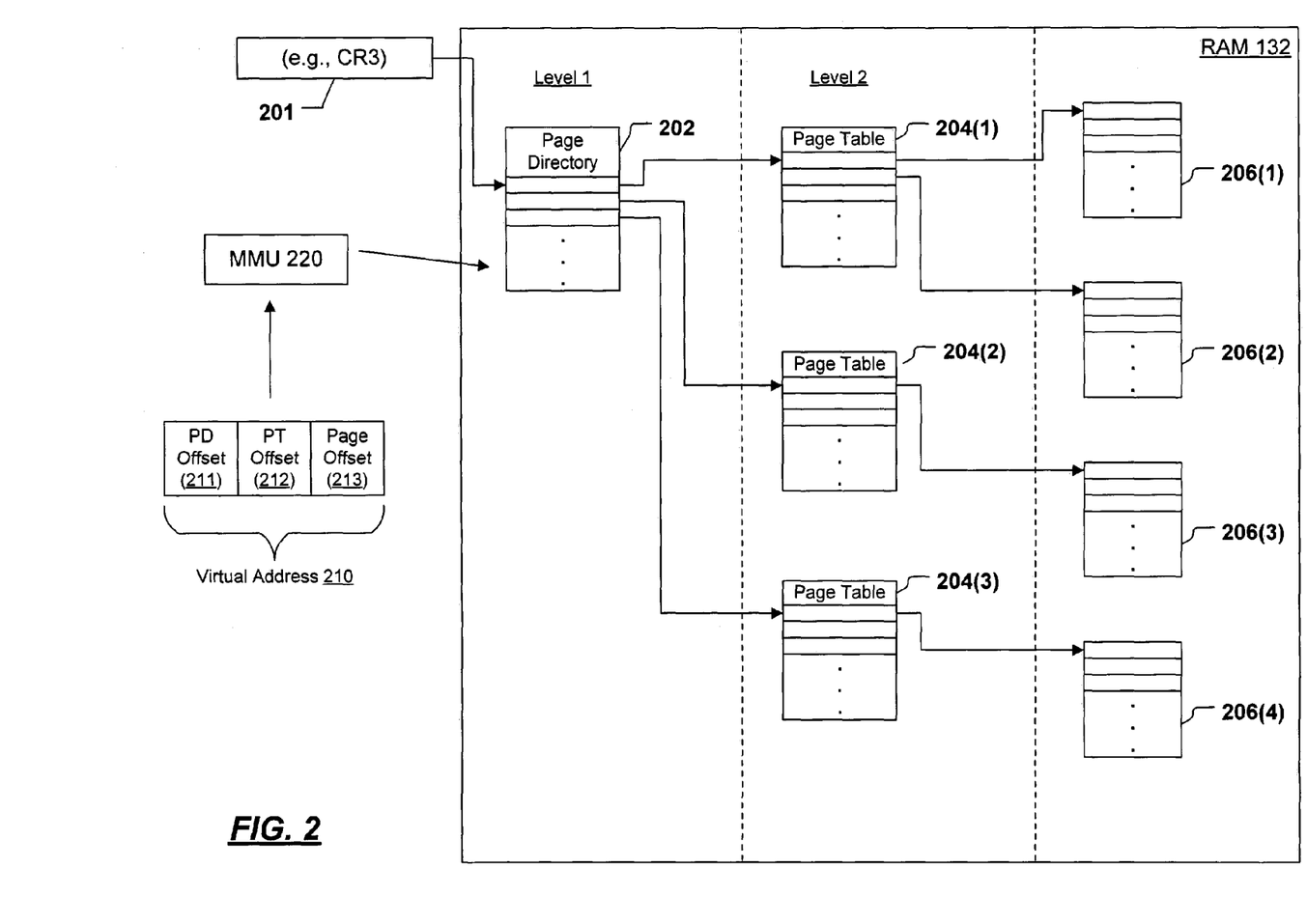
FIG. 2 is a block diagram of a memory system that implements virtual addressing through an address translation map.

FIG. 2 shows an example of an address translation map, and its use in an actual computer system. The exemplary address translation map shown in FIG. 2 is a "paging" scheme, in which memory is allotted in blocks called "pages." FIG. 2 is representative of the paging scheme used on the INTEL x86 processor.

In FIG. 2, page directory 202 contains an array of pointers to (i.e., physical base addresses of) page tables, such as page tables 204(1), 204(2), and 204(3). Each page table, in turn, contains an array of pointers to the base addresses of pages (e.g., pages 206(1), 206(2), 206(3), and 206(4)), and may also contain information such as the read-only/read-write attribute, the present/not-present bit, etc., as described above. Pages are fixed-length portions of RAM 132. Additionally, the page directory and page tables are also typically stored in RAM 132. The paging scheme depicted in FIG. 2 is a two-level paging scheme, since it is necessary to go through both a page directory (level 1) and a page table (level 2) in order to locate a particular page. It will be appreciated by those of skill in the art that it is possible to design a paging scheme with an arbitrary number of levels, and the invention applies to all such paging schemes. It is also known in the art that the INTEL x86 processor typically uses the two-level paging scheme shown in FIG. 2, but can also be configured to use a one-level or three-level paging scheme.

In the paging scheme of FIG. 2, any byte on a page can be identified by a virtual address 210, comprising a page directory offset 211, a page table offset 212, and a page offset 213. Thus, in order to locate a physical address, a memory management unit (MMU) 220 uses page directory offset 211 to locate a particular entry in page directory 202. This entry is a physical base address of a page table, so MMU 220 dereferences this address in order to locate one of the page tables (e.g., page table 204(1)). MMU 220 then uses page table offset 212 as an index into the identified page table, and retrieves the entry found at that offset. The entry is the physical base address of a page (e.g., page 206(1)), so MMU adds page offset 213 to the base address of the identified page in order to locate a particular byte of physical memory. MMU 202 may also be configured to take into account information such as whether a page has been marked read-only or read-write, whether the page is marked present or not-present, etc., as described below in connection with FIG. 3.

The paging scheme of FIG. 2 also includes a storage location 201 that contains a pointer to the page directory. MMU 220 uses this pointer to locate the page directory 202 when it begins to translate virtual address 210. In the example of an INTEL x86 processor, storage location 201 corresponds to the register named CR3—that is, on an INTEL x86 processor, the register CR3 stores the physical address of the page directory for the current context. Thus, it is possible to build alternative sets of translation tables (i.e., two or more sets of page directories and page tables), and to change which set of translation tables applies simply by writing the base address of a new page directory into storage location 201. One common use of this technique is for each process running on a computer to have its own page directory and page tables, where a "context switch" (i.e., an operation that, among other things, causes the virtual memory system to point to the address space of a new process) is performed by writing the base address of the new process's page directory into storage location 201. In the case where each process has its own page directory, the identity of the process that is currently running determines what value is loaded into storage location 201.

Figure 3:
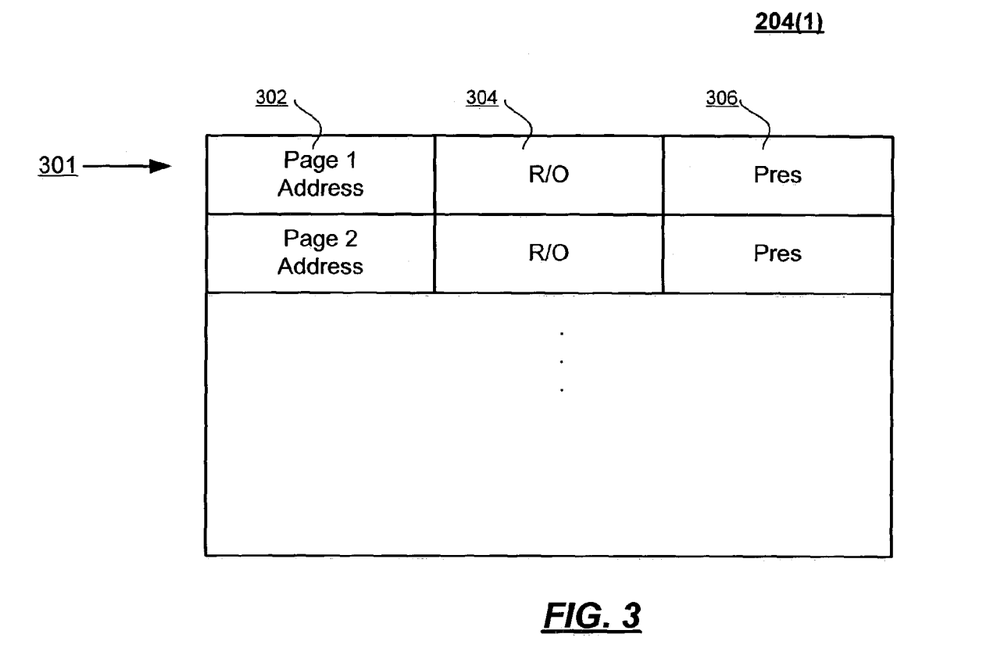
FIG. 3 is a block diagram of an example page table having attributes.

In addition to containing pointers to pages, page tables and page directories may also contain "attributes" for the pages. FIG. 3 shows the detail of an exemplary page table 204(1), which contains both pointers and attributes. Each entry in page table 204(1) includes an address 302 of a particular page, a bit 304 indicating whether the page pointed to by the entry is "read-only," and a bit 306 indicating whether the page pointed to by the entry is "present." Thus, if the first entry 301 in page table 204(1) points to page 206(1) (shown in FIG. 2), then bit 304 indicates, depending on whether it is set to zero or one, whether MMU 220 (shown in FIG. 2) should permit page 206(1) to be both read and written, or only read. Similarly, bit 306 indicates whether page 206(1) is present in memory or not. (Bit 306 may be set to zero, indicating not present, if, for example, the contents of page 206(1) has been moved to disk to make room for other pages in memory.) Other attributes may also be stored in page table 204(1).

Using Address Translation Maps for Memory Access Control

In a system where memory is accessed by virtual address, it is possible to implement a system that limits access to memory based on the following observation: if the address translation map is configured such that no virtual address translates to a given physical address, then the memory represented by that physical address is inaccessible. For example, in the paging scheme described above in connection with FIG. 2, a given page of memory (e.g., page 206(1)) can be made inaccessible by ensuring there is no path leading through the map to that page. In the absence of such a path, there would be no virtual address 210 that would translate to that page. In a system where all memory access is made by virtual address, exerting control over the address translation map to deny virtual addresses to a given page (or other portion) of memory effectively makes that portion of memory inaccessible. Even in systems that permit some physical addressing of memory, memory can be made inaccessible by supplementing control over the address translation map with control over those access requests that are based on physical address.

Figure 4:
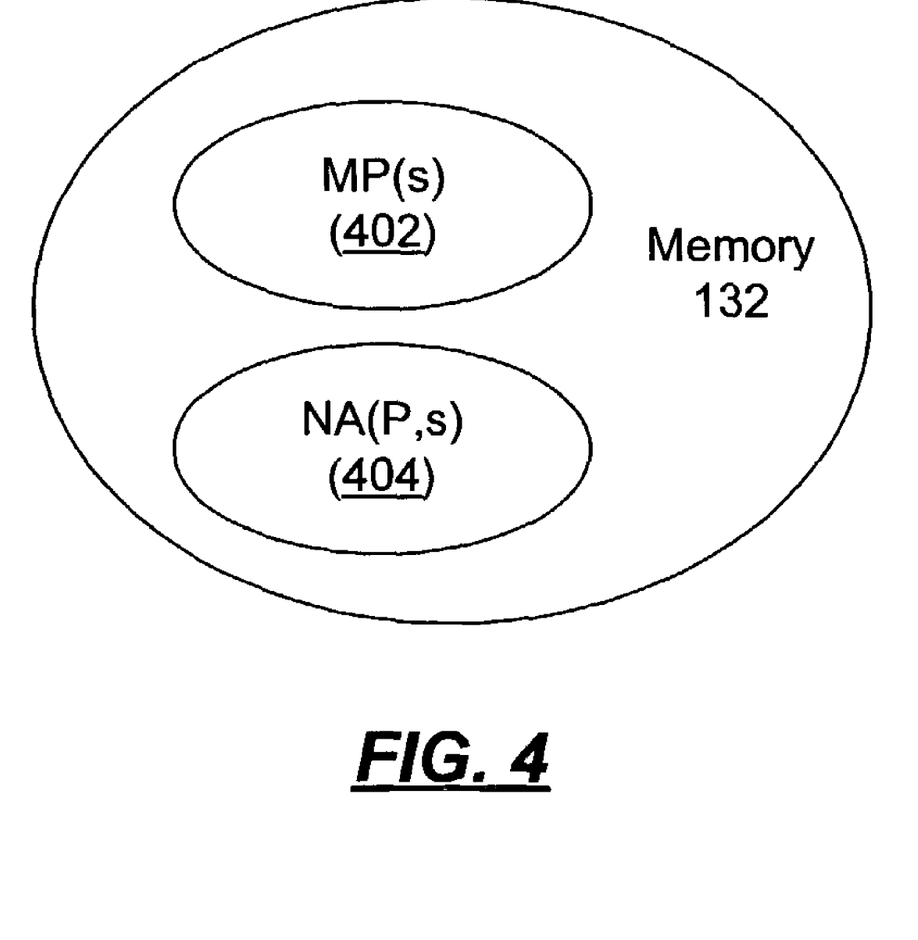
FIG. 4 is a block diagram of two example non-intersecting sets representing a condition that may be used to implement memory access control.

The technique of controlling the contents of an address translation map in order to control access to memory can be stated formally as follows: Assume that S is a set of sources who can potentially access a memory. Assume further that P is a policy that defines which portions of memory can be accessed by which sources. Thus, if s∈S is a source, then MP(s) denotes the portion of memory that is accessible to source s via the address translation map (e.g., the set of memory locations that have virtual addresses), and NA(P,s) denotes the portions of memory that source s is not allowed to access under policy P. (In the case where each process has its own address translation map, each process can be viewed as a different "source," although it will be understood that the concept of a source generalizes beyond the example of a process.) Thus, enforcement of the policy can be assured as long as the condition:

$$NA(P,s) \cap MP(s) = \phi,$$

is satisfied. This condition is depicted in FIG. 4, which shows memory 132 as a set of memory locations, MP(s) 402 as the set of memory locations that are visible to source s through an address translation mapping, and NA(P,s) 404 as the set of memory locations that source s is not allowed to access under policy P. Since none of the locations (MP(s)) that source s can address through an address translation mapping are included in the set of memory locations that source s is not allowed to access under policy P, the condition depicted in FIG. 4 effectively enforces policy P with respect to source s.

Thus, the problem of controlling the access of source s to portions of memory 132 can, in some example situations, be reduced to ensuring that the condition depicted in FIG. 4 is always true. One solution to this problem is to evaluate any operation (e.g., a memory write, a load of the CR3 register, etc.) that has the potential to change the address translation mapping, the policy, or the current source. The present invention provides techniques that allow such an evaluation to be made efficiently.

It will be understood that the condition shown in FIG. 4 is merely exemplary of a condition that can be used to implement memory access control. Other variations on the theme of FIG. 4 are possible, such as those involving the set of memory locations included in the address translation map, the set of memory locations that source s is allowed to access but not to write (or read), etc. It will be noted, however, that the conditions for memory access control typically include verifying the non-intersection of two or more sets of memory locations.

Additionally, while MP(s) can be viewed as being the "mapped pages" visible to source s, it should be noted that the concept of memory access control is not limited to systems that employ a paging scheme. In a typical implementation, the decision as to which memory locations a source is allowed to write under a policy, or which memory locations are mapped to a source, is made on a per page basis. However, the invention is not limited to the case where memory is allocated on a per-page basis, or where access to memory is allowed or restricted on a per-page basis.

Generalized Model for Address Translation

The address translation map shown in FIG. 2 and described above can be generalized using the model of a directed labeled graph. The following describes a generalized model for certain types of address translation maps.

In this model, B is a base set, and L is an alphabet. Given B and L, G=(V,E) is a directed graph with edge labels, such that V⊆B and E⊆{(v,w,l):v∈V, w∈V, l∈L}. Any member of E can be interpreted as a directed edge from vertex v to vertex w with label l. The vertices may also be labeled.

Figure 5:
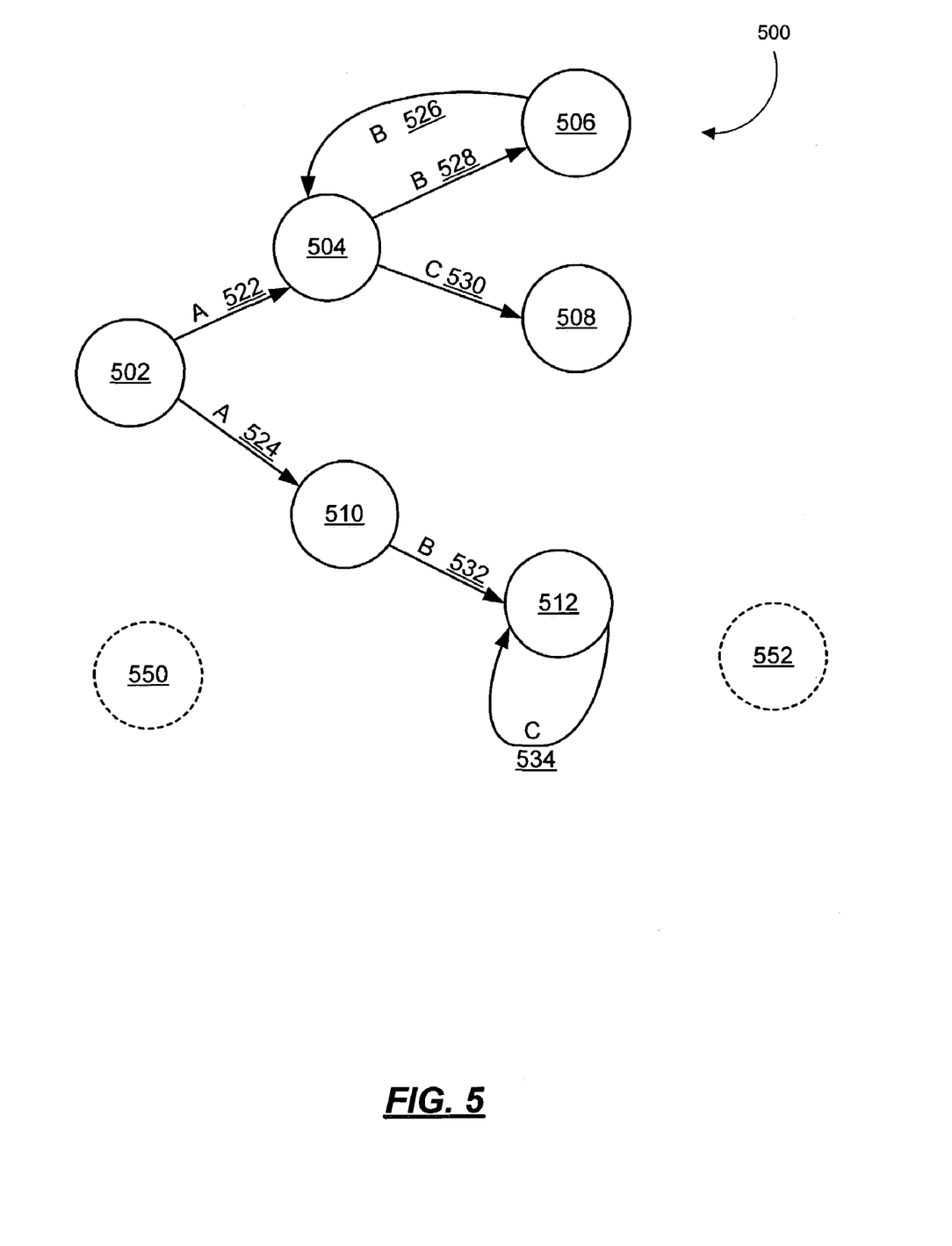
FIG. 5 is a block diagram of a directed labeled graph, which is representative of an address translation map.

FIG. 5 shows a graph according to the model described above. Graph 500 includes vertices 502, 504, 506, 508, 510, and 512. These vertices are connected by edges 522, 524, 526, 528, 530, 532, and 534 in the manner shown. Each edge is labeled with a symbol from an alphabet. In this example, the alphabet comprises the symbols A, B, and C. Thus, edges 522 and 524 are labeled with the symbol A, edges 526, 528, and 532 are labeled with the symbol B, and edges 530 and 534 are labeled with the symbol C. There may also be elements of the base set (e.g., elements 550 and 552) that are not vertices in graph 500.

It should be appreciated that the components of graph 500 correspond to certain components of the address translation map shown in FIG. 2. For example, in FIG. 2 page directory 202, page tables 204(1)-204(3), and pages 206(1)-206(4) can be viewed as vertices in a graph. The pointers that connect these vertices (e.g., the pointers from entries in page table 204(1) to pages 206(1) and 206(2)) can be viewed as edges of the graph. And, with regard to FIG. 3, the attributes 304 and 306 of an entry (e.g., the read-only and present bits) can be viewed as a label for an edge. Thus, the "alphabet" is the set of possible permutations of the attributes. (In the example of FIG. 3 where there are two binary attributes, there are four possible combination, so there are four symbols in the alphabet). In the case where attributes are not used, the alphabet can consist of a "nil" symbol. Moreover, unallocated pages of memory correspond to members of the base set that have no incoming edges.

Within the model of a graph as described above, it is possible to define a "state." Given B and L, a "state" is a pair (R,G), where G is a directed labeled graph as defined above, and R⊆V is a set of vertices of G. R represents a set of "root vertices." Root vertices represent that set of vertices in the base set that can legitimately serve as roots for the graph. In the example of FIG. 2, the set of legal page directories (i.e., those values that are allowed to be loaded into a storage location 201, such as the CR3 register on an INTEL x86 processor) is the set of "root vertices." Given B and L, S is the set of all states.

According to the model defined above, an address translation mechanism (ATM) can be modeled as:

a base set B of vertices
an alphabet L (possibly empty)
an initial state $s_0 \in S$ (S being a state)
a set of state transition rules (possibly empty)

an address translation function global flags

The state transition rules change the ATM from one state to another. It is thus possible to define a set of state transition rules $r_i: S \rightarrow S$ (where i is some index), which change the current state of the ATM. ATMs may have any of the following types of transition rules.

Changing (adding, removing, re-labeling) edges of G

Adding or removing vertices of G

Changing the root set R.

For example, in the example of FIGS. 2 and 3, removing a pointer to a page, or changing the attributes of a page, corresponds to the changing of an edge of the graph. Adding new page directories, new page tables, or new data pages corresponds to the adding or removing of vertices. Defining a new page directory whose base address can be loaded into storage location 201 (e.g., into register CR3) corresponds to a change of the root set. In essence, the current state defines what memory locations are potentially accessible by means of address translation.

As described above, access to memory may be controlled by imposing limiting conditions on an address translation map, such the address translation map does not expose to a source any virtual address for a portion of memory that the source is not permitted to access under the policy. Moreover, as previously noted, the continued existence of those conditions can be evaluated at the time that an operation is performed that could potentially affect the truth of the condition. One way to view this technique for memory access control is that the legal states of an ATM are restricted to some subset T of S, or that some property (or predicate) P about the current state must always be true.

Given some property P (which is distinct from policy P, described above), a request to perform an action that could change the state (execution of $r_i$ for some i) from s to $r_i(s)$ can be evaluated to determine whether $P(r_i(s))$ is true—i.e. if the new (proposed) state that will result from executing $r_i$ will have property P. If the truth of P implies that limits on the access of memory will not be violated, then the truth of $P(r_i(s))$ means that the state change brought about by executing $r_i$ should be allowed to proceed. Otherwise, the operation should not be allowed to proceed.

It should be observed that every memory write could potentially change the state of an ATM. Thus, two observations should be made:

The algorithm has to compute P(s)—possibly frequently.

Typically, the new state s' is derived from an old state s. If the old state had property P, then it may be possible to reduce the complexity of deciding P(s') by assuming P(s) and analyzing only whether the (limited number of) changes to s that produced s' could lead to a violation of P.

The invention provides techniques that allow the truth of P to be computed efficiently. As described below, in many cases this efficiency can be achieved by storing (or caching) certain representative information about the current state of the ATM, which can later be used to decide what tests needed to be performed to confirm the truth of P under a state transition, and which tests can be avoided.

Exemplary Property Classes

One type of property P is a property that can be expressed in terms of sets of vertices. For example, the condition shown in FIG. 4 and discussed above is essentially a property in which the sets MP(s) and NA(P,s) do not intersect each other. Many properties that can be expressed in terms of sets of vertices, and the relationship between these sets, can be implemented efficiently by storing (or caching) the identity of vertices in a set.

Examples of sets that may be useful in evaluating whether an ATM is in a state that satisfies a memory access control condition are:

1. The set of vertices at distance k from the root vertices. More formally, if S is a set of vertices and w is a vertex, let $d_k(S,w)$ denote the statement that there exists a (directed) path of length k from some vertex in S to vertex w. $S_d = \{v \in V: d_k(S,v)\}$. Then, if S is the root vertex, $S_d$ refers to the set of pages at distance d from the root. For example, if vertex 502 is the root of graph 500, then the set of vertices that have distance 1 from the root vertex consists of vertices 502 and 510, since either of these vertices can be reached from the root by traversing one edge. With reference to the page map shown in FIG. 2, page directory 202 is distance 1 from the root, and page tables 204(1) through 204(3) are distance 2 from the root. Thus, in the example of FIG. 2, the addresses of the page directory and the page tables could be cached by storing the identity of those pages that are distance 1 and 2, respectively, from the root.

2. Sets that are determined by edge labels. For example, with reference to FIG. 5, the set of vertices that have an in-edge labeled "A" consists of vertices 504 and 510, and the set of vertices with an in-edge labeled "B" consists of vertices 504, 506, and 512. In the page map of FIG. 2, wherein attributes correspond to edge labels, a set could be defined as those pages having a given attribute. For example, it may be useful to define (and cache) the set of pages that are marked read-only, in which case the set of pages whose read only bit is "on" (reference numeral 304, shown in FIG. 3) can be defined. (It is possible for a page to be referenced more than once in a page map, in which case different references to a page could have their read-only attributes set differently; in this case, the definition of the set could resolve the conflict—e.g., the page is in the set if at least one reference to the page has the read-only attribute, or if every reference to the page has the read-only attribute, etc.)

A distinction can be drawn between local and non-local properties. Local properties can be computed from the edges that are incident on a given vertex. That is, if it is possible to decide if a vertex v has property P only from the edges that are incident on v, we say P is local. Otherwise, P is non-local. An example of a local property is "The vertex has an in-edge which is labeled read-write." An example of a non-local property is "The page (on an x86 machine) has read-write mappings."

3. The set of vertices that are the target of k edges with some property. More formally, if P, Q are predicates and w is a vertex let $$\text{In-deg}_{P,Q}(w) = |\{v \in V: P(v) \text{ and } (v,w,l) \in E \text{ and } Q(l)\}|$$

A set may be defined as the set of vertices with a given in-degree:

$$\{v \in V: \text{In-deg}_{P,Q}(v) = k\}$$

Analogously, sets can also be defined based on inequality—e.g., the set of vertices that are the targets of more than (or fewer than) k edges with some property.

For example, with reference to FIG. 5, the set of vertices that have at least one "C"-labeled in-edge consists of vertices 508 and 512. With reference to the page map of FIG. 2, this type of set definition can be used to cache categories of pages—e.g., the set of pages with two or more mappings, the set of pages with exactly one read-only mapping, etc.

4. A similar set may be defined based on out-degree i.e., the set of vertices that have k out edges (or more than k out edges, or fewer than k out edges) with some property. For example, with reference to FIG. 5, the set of vertices that have exactly two "A"-labeled out edges consists of vertex 502. FIG. 2 contains analogous examples—e.g., the set of pages that have at least 3 out-edges (i.e., references to other pages) includes page directory 202.

These sets may be combined through ordinary set operations (e.g. union, intersection, complement, set difference). For example, if $S_2$ is the set of pages at distance 2 from the root, and the set of pages with read-write mappings in certain configurations of the x86 CPU can be expressed as follows:

({x:x has large page in-edge} intersect {x:x has r/w in-edge} intersect $S_2$) union ({x:x has small page in-edge} intersect {x:x has r/w mapping} intersect $S_3$)

A naïve algorithm might recompute these sets upon each state change by going through every vertex v and testing if it belongs to the set. This may be expensive. If an algorithm computes state properties that can be expressed in terms of sets of the type just described, it can take advantage of caching schemes, as described below:

Caching Schemes

A variety of schemes may be used to cache data for use in the efficient evaluation of state changes. Example caching schemes are described below.

Scheme 1: Simple Set Caching

This scheme explicitly computes the set and stores (caches) it. Upon each subsequent state change, the algorithm updates the cache. In one example, a cache may be maintained that exposes the following access operations:

Init( )—initializes the cache to some well-defined value, such as the empty set.

Add(S)—adds S (a single element or a set of elements) to the cache

Remove(S)—adds S (a single element or a set of elements) to the cache

ShowCache(S)—returns all elements that are currently cached.

The cache may expose additional access operations (e.g. to improve efficiency).

One way to represent such a cache is through a bit vector. For example, if a system has $2^{16}$ physical pages of memory, a vector that is $2^{16}$ bits long (i.e., 8 Kbytes) can represent a Boolean value for each of the pages. The $n^{th}$ bit is either on or off, depending on whether the nth page is in a defined set. Thus, given a defined set of pages, membership in the set can be cached at a cost of one bit per page. It will be appreciated that set operations such as union and intersection are very simple to perform with this type of representation, by using the bitwise "or" and "and" operators.

Scheme 2: Supersetting, Subsetting

Depending on the details of the underlying algorithm that enforces memory access control, the cache may not be required to contain the exact target set. For example, it may be sufficient to cache some superset or some subset of the target set. This may reduce the cost of maintaining the cache. In the example of FIG. 3, the memory access control condition calls for MP(s) not to intersect NA(P,s). However, if it is inconvenient or impractical to compute the exact members of NA(P,s), it may be possible to compute and cache some superset of NA(P,s), and to then ensure that MP(s) does not intersect the computed superset of NA(P,s). This technique may cause the rejection of some state changes that could otherwise be allowed, but will not allow any state changes that should be disallowed—thereby preserving the conditions for memory access control.

Scheme 3: Reversed Edge Representation

Typically, the edges are stored in or with the source vertex. For example, in FIG. 2, the page directory and page tables store pointers to other pages, as well as their attributes. Given a vertex, it is typically easy to find the targets of all outgoing edges. At the same time, it is typically expensive to find the sources of all in-edges. As the vertex carries no information about its in-edges, an exhaustive search of all edges may be required to find all in-edges.

If the algorithm requires fast access to in-edges of vertices—or to information that can be derived from them—it may be advantageous to explicitly store information about the in-edges of each vertex in a data structure that is somehow associated with the vertex. The term "somehow associated" means that, given the vertex, it is easy to find the data structure (e.g. array lookup).

In the most extreme case, the data structure stores all in-edges. In this case, the data structure could be a cache such as the one defined above, whose elements are edges. (Also, the caches may store sets or multisets.) The storage taken up by this structure is proportional to the number of in-edges of the vertex and, if structures of this type are maintained for all vertices, the total storage is proportional to the number of edges in the graph.

It is often sufficient to store derived information, which may require less storage. For example, the algorithm might only store the number of in-edges of each vertex. In this case, the cache may be implemented as a reference counter. Reference counters typically expose the following access operations Init( )—initializes the cache to some well-defined value, such as 0.

Increment( )

Decrement( )

GetValue( )

One common use of reference counters (or similar data structures) is to construct sets. For example, an exemplary memory access control algorithm may have to compute the set of vertices without in-edges, i.e. the set of vertices, whose reference count is 0. The collection of reference counters can control a cache (Scheme 1) of this set as follows: Whenever the value of a reference counter is changed, the algorithm tests if it has become zero. If so, it adds the vertex to the cache. Similarly, the algorithm watches for the event that a reference counter that was zero obtains a different value. In this event, the algorithm removes the vertex from the cache.

The following are some examples of using caching:

Caching supersets $S_d'$ of $S_d$ for d=1,2,3

For d=2,3: The cache can be (a) stored explicitly, or (b) driven by a reference counter Computing local label properties: "has read-write in-edges" and "has large/small page in-edges"

Computing non-local properties: "has read-write mappings"

Using reference counters for the number of read-write in-edges of vertices in $S_2$.

This information can be used to speed up computation of the non-local property "has read-write mappings".

Exemplary Process for Memory Access Control Using Stored Information

Figure 6:
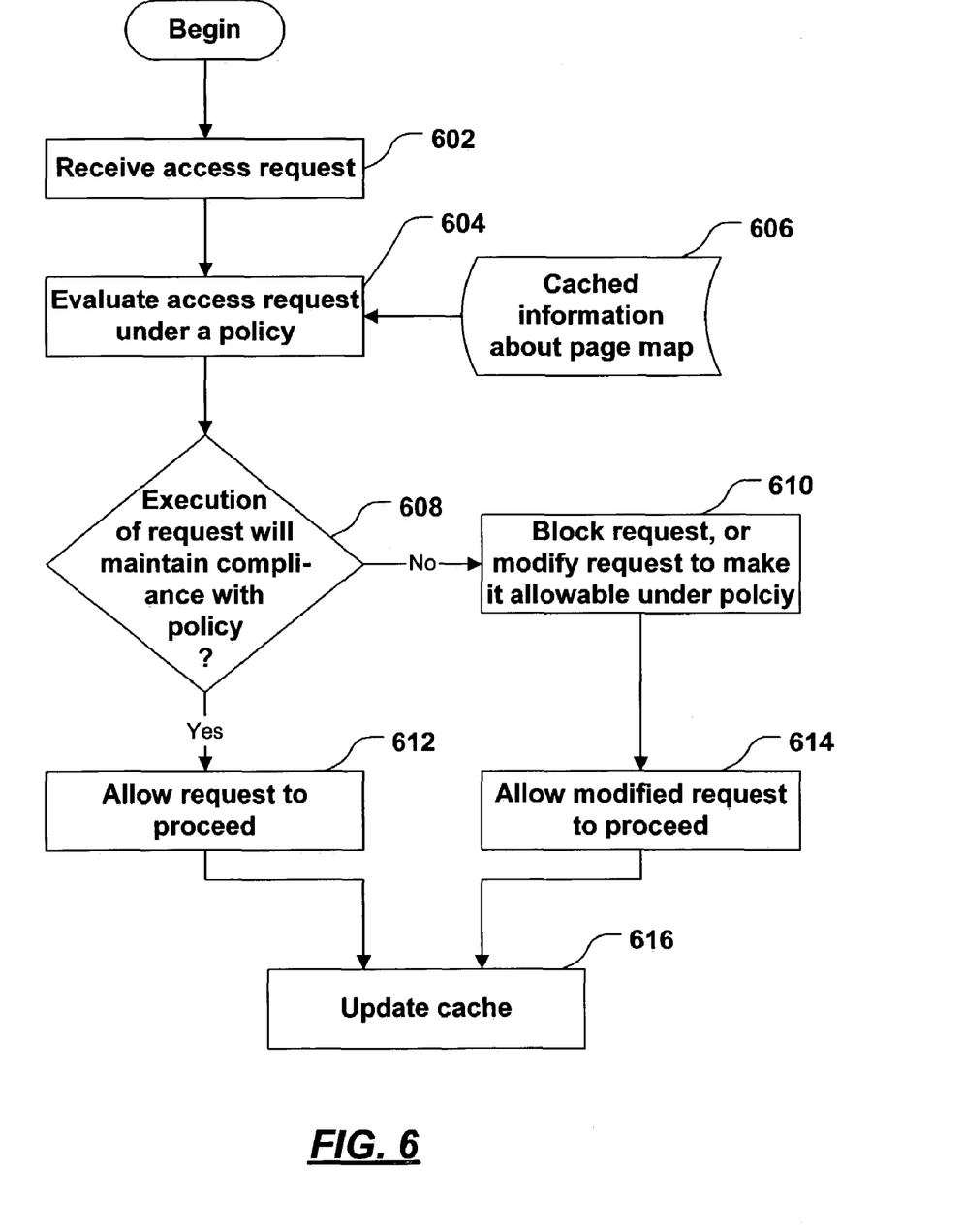
FIG. 6 is a flow diagram of an exemplary memory access control process.

FIG. 6 shows an exemplary process for performing memory access control, using techniques described herein.

Initially, a request to access memory is received (602). When the access request is received, a memory access control system evaluates the request to determine whether execution of the request would comply with a policy governing memory access (604). Examples of memory access policies are discussed above. As one example, the policy may define certain pages as off-limits to a set of sources, and the policy may prohibit any access request that would result in creating, for one of the off-limits pages, a mapping that would be visible to one of the sources that is not allowed to access that page. Evaluation of the request may be aided by stored or cached information (606). This stored or cached information may contain information about the page map(s)—e.g., the set of pages that are known to contain legitimate page directories.

If it is determined that carrying out the request will maintain compliance with the policy (608), then the request is allowed to proceed (612). Otherwise, the request is blocked, or modified into a form that would not violate the policy (610). One example of modifying a request to a form that does not violate the policy is as follows: if a request seeks to write an entry to a page table that would result in mapping to an off-limits page, the request can be modified so that the entry is written but the page's "present" bit is turned off. Thus, any future attempt to access the newly-mapped page will generate an exception, so the exception handler can ultimately thwart access to the off-limits page. If the request is modified in this manner (or in some other manner), then the modified request is then allowed to proceed (614). After either the modified or unmodified request has been carried out, if the carrying out of the request causes a change to the cached information, then the cache may be updated (616).

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-readable storage medium encoded with computer-executable instructions to perform a method of processing a memory access request, the method comprising:

receiving a request to access a portion of a memory, said request identifying the portion of memory to be accessed through an identifier that is translatable through an address translation map;

determining, based on cached information about said address translation map, whether execution of said request will violate a policy that limits access to said memory, wherein said cached information includes data identifying a set of pages of said address translation map that have a predetermined property;

if execution of said request will not violate said policy, then allowing access to said memory in accordance with said request; and if execution of said request will violate said policy, then either:

blocking said request; or modifying said request such that said request does not violate the policy, and carrying out the modifying request.

2. The computer-readable storage medium of claim 1, wherein said request comprises a request to wrute said portion of said memory.

3. The computer-readable storage medium of claim 1, wherein said address translation map is stored in said memory, and wherein said request comprises a request to write a portion of memory in which said address translation map is stored.

4. The computer-readable storage medium of claim 1, wherein said cached information includes data identifying a set of pages in said address translation map that are located at a predetermined distance from a root said address translation map.

5. The computer-readable storage medium of claim 1, wherein said cached information includes data indicative of a number of references to a specified page.

6. The computer-readable storage medium of claim 1, wherein said cached information includes data indicative of a number of references to a specified page, wherein said references have a specified attribute.

7. The computer-readable storage medium of claim 1, wherein said cached information includes data indicative of a number of pages to which a specified page in said address translation map refers.

8. The computer-readable storage medium of claim 1, wherein said cached information includes data indicative of a number of pages to which a specified page in said address translation map refers, and to which the specified page assigns a specified atttibute.

9. The computer-readable storage medium of claim 1, wherein compliance with said policy is determined based on a page's membership in a set, wherein said cached information includes a proper superset of said set, and wherein said act of determining whether execution of said request will violate said policy comprises evaluating whether said page is a member of said superset.

10. The computer-readable storage medium of claim 1, wherein compliance with said policy is determined based on a page's membership in a set, wherein said cached information includes a proper subset of said set, and wherein said act of determining whether execution of said request will violate said policy comprises evaluating whether said page is a member of said subset.

11. A method of managing a computer memory to which access is provided through an address translation map, the method comprising:

storing information about at least one aspect of the state of the address translation map, wherein the stored information includes data identifying a set of pages of the address translation map that have a predetermined property;

receiving a request to access the computer memory;

determining, based at least in part on the stored information, that carrying out of the request will not violate a policy that limits access to the computer memory;

allowing the request to be carried out; and updating the stored information to reflect the state of the address translation map resulting from carring out the request.

12. The method of claim 11, wherein said request comprises a request to write a portion of the computer memory.

13. The method of claim 11, wherein the address translation map is stored in said computer memory, and wherein said request comprises a request to write a portion of memory in which said address translation map is stored.

14. The method of claim 11, wherein the stored information includes data identifying a set of pages in the address translation map that are located at a predetermined distance from a root of the address translation map.

15. The method of claim 11, wherein the stored information includes data indicative of a number of references to a specified page.

16. The method of claim 11, wherein the stored information includes data indicative of a number of references to a specified page, wherein said references have a specified attribute.

17. The method of claim 11, wherein the stored information includes data indicative of a number of pages to which a specified page in the address translation map refers.

18. The method of claim 11, wherein the stored information includes data indicative of a number of pages to which a specified page in the address translation map refers, and to which the specified page assigns a specified attribute.

19. The method of claim 11, wherein compliance with said policy is determined based on a page's membership in a set, wherein the stored information includes a proper superset of said set, and wherein said act of determining that carrying out the request will not violate said policy comprises evaluating whether said page is a member of said superset.

20. The method of claim 11, wherein compliance with said policy is determined based on a page's membership in a set, wherein the stored information includes a proper subset of said set, and wherein said act of determining that carrying out the request will not violate said policy comprises evaluating whether said page is a member of said subset.

21. A system for controlling access to a memory that is addressed by way of an address translation map, the system comprising:
   one or more storage locations that store a policy that limits access to the memory;
   a cache that stores information about the address translation map, wherein the information stored in said cache comprises data identifying a set of pages of said address translation map that have a predetermined property; and
   logic that receives a request to access the memory, and that determines, based at least in part on the information stored in the cache, whether the request is allowable under said policy, said logic allowing the request to proceed if said request is determined to be allowable under the policy, said logic either (1) blocking said request, or (2) modifying said request into a form that is allowable under the policy and allowing the modified request to proceed, if said request is determined not to be allowable under the policy.

22. The system of claim 21, wherein said request comprises a request to write a portion of said memory.

23. The system of claim 21, wherein said address translation map is stored in said memory, and wherein said request comprises a request to write a portion of memory in which said address translation map is stored.

24. The system of claim 21, wherein the information stored in said cache comprises data identifying a set of pages in said address translation map that are located at a predetermined distance from a root of said address translation map.

25. The system of claim 21, wherein the information stored in said cache includes data indicative of a number of references to a specified page.

26. The system of claim 21, wherein the information stored in said cache includes data indicative of a number of references to a specified page, wherein said references have a specified attribute.

27. The system of claim 21, wherein the information stored in said cache includes data indicative of a number of pages to which a specified page in said address translation map refers.

28. The system of claim 21, wherein the information stored in said cache includes data indicative of a number of pages to which a specified page in said address translation map refers, and to which the specified page assigns a specified attribute.

29. The system of claim 21, wherein compliance with said policy is determined based on a page's membership in a set, wherein the information stored in said cache includes a proper superset of said set, and wherein said logic determines whether allowing said request will violate said policy by evaluating whether said page is a member of said superset.

30. The system of claim 21, wherein compliance with said policy is determined based on a page's membership in a set, wherein the information stored in said cache includes a proper subset of said set, and wherein said logic determines whether allowing said request will violate said policy by evaluating whether said page is a member of said subset.

31. The system of claim 21, wherein said logic is implemented in at least one of hardware or software.

* * * * *